United States Patent Office 2,744,507
Patented May 8, 1956

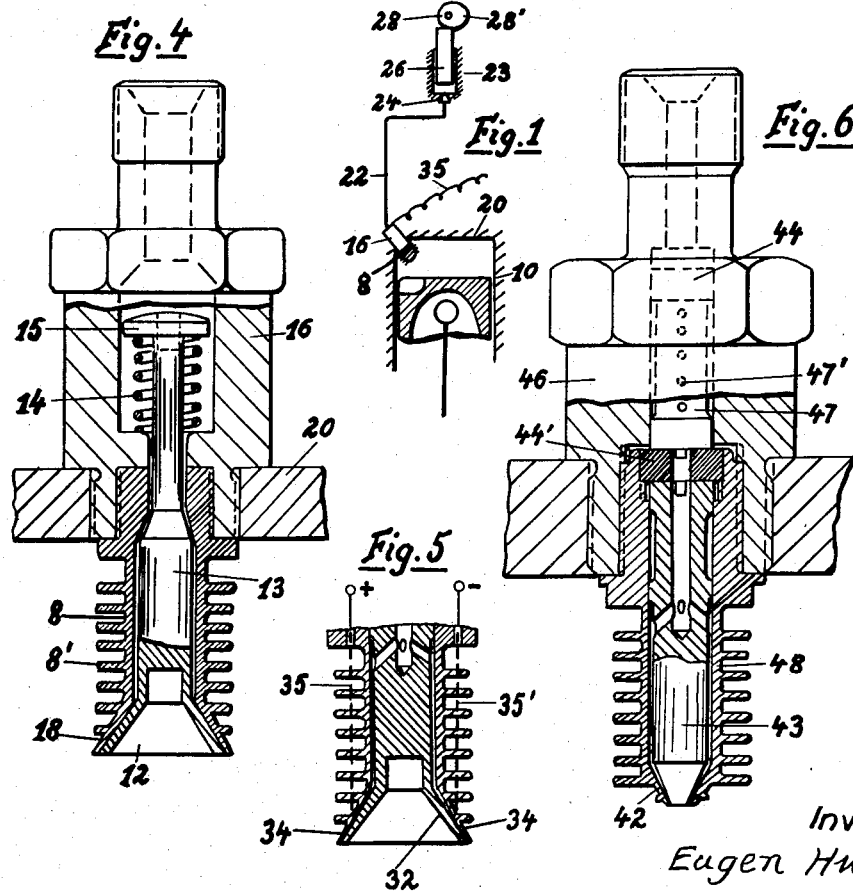

2,744,507

MEANS FOR TREATING LIQUID FUEL BEFORE ITS INJECTION INTO THE WORKING CYLINDER OF INTERNAL COMBUSTION ENGINES

Eugen Huber, Munich, Germany, assignor to Inconex Handelsges. m. b. H. für industrielle Produkte-Konstruktionen-Export, Stuttgart, Germany, a firm Application February 7, 1951, Serial No. 209,733

2 Claims. (Cl. 123—32)

My invention relates to improvements in operating internal combustion engines, wherein a combustible mixture of hydrocarbon and air is formed within the working cylinder of the engine and is burned therein by self-ignition, and deals more particularly with an improved process and means for treating and conditioning liquid hydrocarbons to be fed thereinto, with the principal object in view to operate Otto-cycle and kindred motors of the four cycle type with any motor oil from the light grades to the heavier ones.

In connection therewith the invention aims at providing a redesigned relatively small size internal combustion motor, capable of running at high rotary speed and distinguished by its light weight and structurally simple actuating mechanism like that of the Otto-cycle motor, and by the low fuel consumption of the diesel-cycle motor.

The invention further aims at operating internal combustion engines, wherein the ignition of the charge is initiated from without, with low grade fuels having relatively high boiling and evaporating points.

Another object of the invention is to operate motors, working under internal or self ignition of the charge, with low grade fuels of rather low burning type, namely in a more efficient manner, wherein the combustion occurs at lower compression ratios than required in conventional diesel-cycle motors, thus enabling the building of high-speed fuel-injection motor with lighter and cheaper actuating mechanism than heretofore.

In the diesel-motor field fuel feeding means having injection nozzles are known, the front portion of which projects to some extent into the combustion space of the motor-cylinder, so that the fuel in said front portion of the nozzle is heated up, before being injected under the control of a needle valve. However this proposition entails an excessively big cylinder head and can be realized only with large size diesel motors, but is not applicable to operate Otto-cycle motors with fuel oils of the heavier grades.

It is further known to evaporate the charges of fuel, injected into the motor by an injecting pump and through a nozzle under the control of the pressure of the pump, viz. by means of heating surfaces provided in the combustion space of the cylinder, which are heated up by the heat produced in the preceding working stroke of the piston. With arrangements and working methods of that description injection nozzles, controlled from without by specific, complicated controlling mechanism, are required; otherwise, the fuel may become vaporized within the nozzle proper and the correct timing of the injection of vaporized fuel into the cylinder would be impaired.

Another method of conditioning the fuel, known in the internal combustion motor field, is directed to a pyrogenic decomposition or distortion of the fuel molecules in the presence of air.

Moreover in another instance the liquid fuel was heated up before being fed into the machine with the object of being partly or completely evaporated in the presence of air.

In contradistinction to the aforesaid fuel conditioning processes and injecting arrangements, the process of treating liquid fuels before injection into the working cylinder of internal combustion engines, and improved according to this invention, comprises causing the fuel under treatment, on approaching the engine to be preheated under pressure and within its liquid phase by heat issuing from within the cylinder of the engine to cracking temperatures, and causing the preheated fuel to be released therefrom and injected under increased pressure into the cylinder of the engine in synchronism with its cycles, so as to be vaporized spontaneously, cracked and decomposed in its molecular structure.

It may be further explained, in other words, that this novel injector is applied to the treatment of liquid fuels in injection type engines prior to the release of the fuel charges into the combustion chamber, whereby to fully prepare the fuel for instantaneous transformation of the liquid phase, upon release, to vapors of lighter grades or fractions of the combustible components of the fuel resulting from cracking temperatures attained at the very high pressures before its release into the comparatively lower pressures in the combustion chamber, where it is ignited instantly as it mixes with the compressed air, and burns progressively as it continues to be released to mix with the remaining oxygen of the compressed air charge. There is no delay in the burning process upon release of these highly superheated fuels of higher grades than the original grades of the fuel components supplied to the injector, as there is with these lower grades of fuels when injected without superheating to cracking temperatures before injection, where additional heat must be obtained from the combustion chamber after injection has started in order to propagate the combustion to the fuel mixtures as the fuel is injected. Thus, by using this structure, an optimum and efficient control of the combustion cycle is possible of attainment by simply controlling the rate of injection with respect to the speed of the engine by a properly designed slow rising cam for cyclical operation of the fuel pump.

The invention in its concrete and functional details and with the advantages obtained is disclosed in the following specification, and will be more fully understood from the accompanying drawing, wherein Fig. 1 outlines the principal component parts of a fuel treating and injecting device for internal combustion engines, redesigned according to this invention.

Figs. 2 and 3 are diagrams elucidating the pressure and heat treatment to which the liquid fuel is subjected on approaching and entering the internal combustion engine, and wherein the lower line $x$ in Fig. 2 shows the entropy (A—B) of relatively heavy so-called diesel- and tractor fuel oils, while the upper line $y$ relates to lighter hydrocarbons, liquid fuels of the benzol and gasoline types; the pressures in atmospheres in excess of atmospheric pressure are to be seen in Fig. 2 on a logarithmically graduated scale and in Fig. 3 in linear or conventional progression. Simply stated, Fig. 2 represents gas liquid equilibrium curves for the indicated liquid fuels, where all points above the applicable line for the fuel in question represent the liquid phase, and all points below the lines indicate the gaseous phase.

If, for example, in Fig. 2, one passes from the point A at a high temperature, in an extremely short time to the point B, that is, to a pressure which lies below the vapor pressure, the sudden change-over from the liquid into the vaporous phase, which latter requires a many times greater space, causes a splitting up of the fuel by its intrinsic energy and consequently a considerably finer distribution of the fuel than can be attained with the usual atomizing process on the mouth of normal injection nozzles with the aid of high speeds and by the influence of the nozzle edge; but lower injection pressures are also required.

It will be seen from the diagram, Fig. 3, that the fuel under a preliminary pressure of about 10 atms. is brought, under the influence of the piston movement of the injection pump, first to the spraying pressure and the fuel is then injected with a pressure increased to 20 to 60 atms. At the end of the piston stroke the pressure in the fuel converter and the feed conduit returns to the former preliminary pressure.

Fig. 4 shows by way of an example a fuel treating and injecting device, redesigned according to this invention, in section taken longitudinally therethrough.

Fig. 5 is a fragmentary section through a structurally modified fuel treating and injecting device.

Fig. 6 is another structural modification of a fuel treating and injecting device partly shown in fragmentary section taken longitudinally therethrough.

The fuel treating and injecting device shown in Figs. 1 and 4 comprises

1. A tubular heat exchanger or autoclave structure 8, bodily projecting into the working cylinder 10 of the motor and being jacketed with heat absorbing ribs 8', circumferentially therearound and in spaced relation to each other. The volume of the material surrounding the chamber is designed in such a way that it is able to store the necessary heat for the treatment of the required quantity of fuel. In other words, the exterior surface surrounding the heating chamber showing towards the combustion chamber is designed relative to the interior surface of the heating chamber directed towards the fuel in such a way under all service conditions that the quantity of heat taken from the combustion gases by the exterior surface of the material surrounding the chamber is equal to the quantity of heat required for the treatment of the fuel.

2. A conical non-return valve 12, reciprocatably held by its stem 13, spring 14, and nut 15, attached thereon, and closing the lower exit of the autoclave, which is formed with the conical seat 18; a housing 16 on which the autoclave 8 is attached, is detachably fixed in the cylinder head 20 of the motor.

3. A pipe 22, interconnecting the autoclave 8 and housing 16 with a fuel supply pump 23 through another non-return valve 24.

4. Pump operating means, including a reciprocating plunger 26 and a cam 28 (Fig. 1), and pressure and heat-responsive controlling means (not shown) cooperatively interconnected with the autoclave pipe 22, and pump operating means and capable of adjustment are provided for keeping the fuel in the pipe 22, housing 16 and autoclave 8 under pressure sufficiently high above its specific evaporation point, viz. so as to safeguard the fuel in the autoclave 8 against premature evaporation, and for timely injecting—in synchronism with the cycles of the engine—under growing pressure the preheated and cinditioned fuel into the working cylinder 10.

It has been found, that the rotary cam 28 for operating the pump 23 may have a rather slowly ascending curved working section 28' on its circumference and in consequence thereof higher speed and a greater number of revolutions per minute are attained than heretofore, an important factor especially in connection with two-cycle motors.

Good results were obtained with heavy fuel oils by keeping the pressure within the autoclave 8 from about 5 to 10 atmospheres higher than the pressure within the working cylinder of the motor at the time of injection, and to inject the conditioned fuel under increasing pressures, ranging from 20 to 60 atmospheres in excess of atmospheric pressure.

The most significant and meritorious feature of the fuel treating and injecting device, shown and described consists, therein, that the liquid fuel is prepared in the autoclave under heat and pressure for a real cracking process, viz. the fuel on being released therefrom and entering the working cylinder will expand and will be abruptly vaporized, accompanied by a spontaneous cracking, decomposing and distorting of its molecular structure.

As diagrammatically shown in Fig. 5 the heat exchanging autoclave may be equipped to advantage with auxiliary heating means, in the form of electric resistance coils or wires 35, 35', adapted to be temporarily short circuited for the purpose of heating the fuel in the autoclave, while the motor is in cold condition and is just started to run for a fresh working period. Another structural modification of the autoclave seen in Fig. 5 consists therein, that the non-return valve 32 diverges with its conically shaped faces from those of its seat 34 at a small angle, thus presenting a narrow gap therebetween, enlarging the heating surfaces and promoting the heating effect.

Still other structural modifications and auxiliary arrangements may be conveniently made in the various component parts of fuel treating and injecting devices shown and described, without departing from the spirit and the leading ideas of this invention:

For instance in the course of my experiments and research work an autoclave 48, seen in Fig. 6, was used with good results, of which the lower end was formed with a nozzle 42, having conically converging inner faces and with a needle valve 43 fitted therein in a specific manner, viz, so that the fuel is retained in the autoclave while being preheated and conditioned under moderate pressure, and is automatically released under increased pressure on being injected. In addition thereto in the housing 46 and the autoclave 48 shown in Fig. 6, means 44 and 44' for filtering and straining the fuel under treatment are accommodated and also insulating means 47 formed with openings 47', contractions and recesses in and between its component parts for baffling and retaining the heat induced in the autoclave.

It will be noted that the shape of the projecting portion of the injector in the combustion chamber is cylindrical with a thick valve stem, providing a small clearance for an annular film or layer of fuel in between, in order to ensure an intimate heat transmission over an extended surface from the combustion chamber to the fuel under pressure before its injection. This enables the projecting portion of the injector to be made short enough while supplying a suitable volume of liquid fuel in a sufficiently thin film to maintain it at the required high temperatures by providing a large heat transfer area.

While the cylindrical structures are best in cross-section for withstanding internal pressures, the extremely high temperatures and pressures to which the projecting injector structure is subjected, would require comparatively thick cylinder walls to maintain the required strength longitudinally as well as in the cross-sectional plane. But thick walls would mean retardation and restriction of heat transfer to the fuel, as well as increase in heat losses to the collar cylinder head, etc. By providing fins 8', it is possible to use thin walls, because the fins inherently reenforce the structure sufficiently, while simultaneously providing the necessary additional heat transfer surface to the structure material so that sufficient heat might be delivered to the fuel in the injector.

What I claim is:

1. A device for the purpose described adapted to be fitted in the head of a cylinder of an internal combustion engine, said device including an injection plug having one end threaded for screwing into the cylinder head, a valve casing projecting axially from the threaded end of the plug and adapted to extend into the compression space of the cylinder, said casing having a frusto-conical valve seat at its free extremity, said plug having an axial fuel inlet passage communicating with said casing, a valve stem reciprocable in the casing and affording a communicating clearance with said casing between said passage and the valve seat end of the casing, a frusto-conical valve on the end of said stem and normally closing on said seat, and heat absorbing fins surrounding the valve casing, said valve stem and casing being so disposed that said communication between the fuel inlet passage and the valve comprises an elongated narrow annular space adapted to maintain fuel accumulated therein in a thin layer while disposed in heat exchange relation with said heat absorbing fins and valve casing.

2. A device for the purpose described adapted to be fitted in the head of a cylinder of an internal combustion engine, said device including an injection plug having one end threaded for screwing into the cylinder head, a valve casing projecting axially from the threaded end of the plug and adapted to extend into the compression space of the cylinder, said casing having a frusto-conical valve seat at its free extremity, said plug having an axial fuel inlet passage communicating with said casing, a valve stem reciprocable in the casing and affording a communicating clearance with said casing between said passage and the valve seat end of the casing, a frusto-conical valve on the end of said stem and normally closing on said seat, elastic means located in said plug urging said valve onto said seat against the influx of fuel, and heat absorbing fins surrounding the valve casing, said valve stem and casing being so disposed that said communication between the fuel inlet passage and the valve comprises an elongated narrow annular space adapted to maintain fuel accumulated therein in a thin layer while disposed in heat exchange relation with said heat absorbing fins and valve casing.

References Cited in the file of this patent

UNITED STATES PATENTS

| | | |
|---|---|---|
| 1,160,480 | Wheeler | Nov. 16, 1915 |
| 1,324,406 | Ohlsson | Dec. 9, 1919 |
| 1,432,214 | Sperry | Oct. 17, 1922 |
| 1,492,111 | Tartrais | Apr. 29, 1924 |
| 1,709,744 | Schnurle | Apr. 16, 1929 |
| 1,760,322 | Selby | May 27, 1930 |
| 1,845,601 | Herr | Feb. 16, 1932 |
| 2,099,278 | Schimanek | Nov. 16, 1937 |
| 2,108,706 | Crillon | Feb. 15, 1938 |
| 2,113,601 | Pratt | Apr. 12, 1938 |
| 2,146,032 | Scott | Feb. 7, 1939 |
| 2,435,213 | Hancock | Feb. 3, 1948 |

FOREIGN PATENTS

| | | |
|---|---|---|
| 531,758 | France | Jan. 20, 1922 |
| 627,957 | France | Oct. 17, 1922 |
| 781,896 | France | May 23, 1935 |
| 392,929 | Germany | Mar. 27, 1924 |

OTHER REFERENCES

Page 2492 of "The Science of Petroleum," vol. IV, Oxford University Press, New York, 1938.

Page 103 of "Conversion of Petroleum," by A. N. Sachanen, Reinhold Publishing Co., New York, 1940.